UNITED STATES PATENT OFFICE.

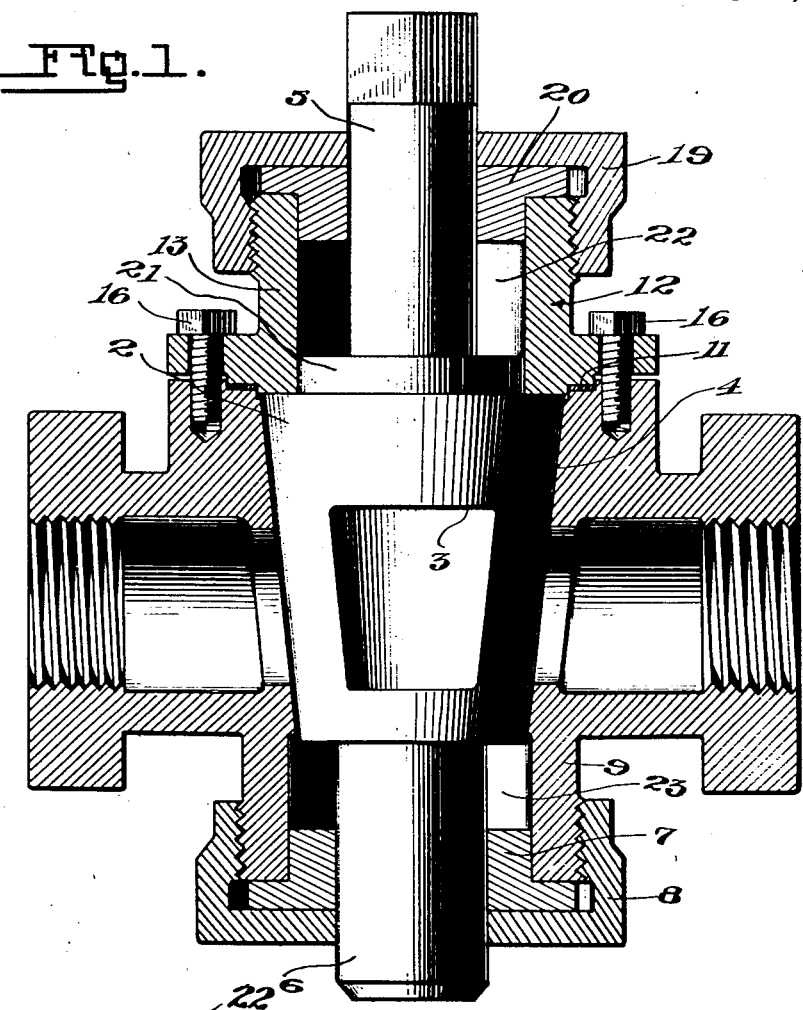

FREDERICK C. HEYLMAN, OF MARTINEZ, CALIFORNIA.

STOPCOCK.

1,387,714.   Specification of Letters Patent.   Patented Aug. 16, 1921.

Application filed December 10, 1918. Serial No. 266,108.

*To all who it may concern:*

Be it known that I, FREDERICK C. HEYLMAN, a citizen of the Netherlands, residing at Martinez, in the county of Contra Costa and State of California, have invented certain new and useful Improvements in Stopcocks, of which the following is a specification.

This invention relates to stop cocks, and an object of the invention is to provide a stop cock adapted to be used for liquid, gas, air or steam, under high pressure which embodies means to prevent leaking of the fluid passing through the valve or stop cock, comprising a ring gasket which is seated in an annular recess formed in the face of the main body casting of the stop cock or valve and is compressed therein by an extra guard or flange which is detachably connected to the body casting of the valve or stop cock and has a screw cap detachably connected to its outer end for forcing the flat packing gland into engagement therewith and holding the latter in place.

More specifically, an object of the invention is to provide, in a valve structure as specified, recesses in the extra or auxiliary guard or flange and body of the valve for engaging the circular packing gasket, to prevent this gasket from being blown out, under high pressure, as well as to prevent the leaking of the fluid which passes through the stop cock or valve about the exterior of the cone of the valve, and also to initially make the packing gasket of less width than the width of the recesses, so that the gasket may be firmly and securely compressed in place upon the connection of the extra part or flange to the body of the valve.

Other objects of the invention will appear in the following detailed description, taken in connection with the accompanying drawing, forming a part of this specification and in which drawing:

Figure 1 is a vertical section through the improved stop cock or valve.

Fig. 2 is an enlarged fragmentary section through the improved stop cock or valve.

Referring more particularly to the drawing, 1 indicates the main body casting of the stop cock or valve structure, which is provided with alining ways adapted to convey the fluid through the valve, the passage of the fluid through which way is controlled by the rotation of the valve cone 2, provided with the ways 3, adapted to aline with the ways in the body 1.

The body 1 of the valve is provided with the vertical or transverse opening 4 in which the cone 2 is seated or rotated and the cone 2 has stems 5 and 6, formed upon its upper and lower ends respectively. A suitable packing flange 7 is mounted about the stem 6 and forced into engagement with the body casting 1 by a screw cap 8 which is threaded upon the lower projecting portion 9 of the body 1.

The upper end of the body 1 is provided with an annular seat 10 surrounding the upper end of the opening 4 upon which seat is positioned a circular or ring gasket 11. As shown in Fig. 2 of the drawings, the seat 10 is wider than the gasket 11, leaving slight spaces upon the inner and outer edges of the gasket in the seat. The gasket 11 is held and also compressed within or upon the seat 10 by the gland or guard 12 which comprises the cylindrical portions 13 and the horizontal annular flange 14 which latter is provided with openings 15 adapted to receive set screws 16 for connecting the glands 12 to the body 1 of the stop cock. The annular flange 14 is provided with a depending annular portion 17 adapted to engage against the upper side of the gasket 11 to compress the gasket upon the screwing of the set screws 16 into the threaded opening 18 in the body 1 for forming a fluid-tight joint between the gland 12 and body 1 and prevent the escape of fluid from the body at this point. The depending annular projection 17 is also adapted to have peripheral engagement with the inner surface of the outermost guide of the seat 10 to securely lock the gasket in place and prevent it from being blown out of the seat 10 under high pressure fluid passing through the stop cock or valve.

The cylindrical portion 13 of the gland or guide 12 is provided with external screw threads near its outer end which coact with the internal screw threads of the depending flange of a screw cap 19 which cap compresses or forces a packing gland 20 in proper position within and against the outer end of the cylindrical portion 13 of the gland or guide 12.

It will be noted that the cone 2 of the stop cock or valve structure has an annular reduced portion 21 formed upon its upper end which fits in the cylindrical portion 13 of the flange or guide 12, while the lower end of this portion 13 fits into the upper end of the opening 4 of the body 1, furthering the fluid-tight connection between flange or guide 12 and the body 1.

If it is so desired, any suitable type of packing material may be placed within the spaces 22 and 23 without departing from the spirit of this invention.

Changes in detail may be made without departing from the spirit of the invention, but;

I claim:

1. A device of the character described comprising a body casting having alining ways therethrough, and a central chamber communicating therewith, said chamber having a frusto-conical wall, a conical plug fitted to turn in said chamber and having a port adapted to register with said ways, a stem projecting upwardly from said plug, said casting provided with an internal groove at its upper end having an external shoulder, said body casting having screw threaded sockets opening out on its upper face, a gland placed upon said body casting and having an annular flange provided with openings above said sockets, said gland provided with a depending ring adapted to slidably enter said groove, screws fitted through the openings in said flange and engaging the threads in said sockets, a gasket of narrow width compared to said groove seated therein and adapted to be compressed by said gland, said gland extending inwardly above the plug chamber and having a depending central portion engaging the upper end of the plug for holding the same tightly seated in the frusto-conical wall of the casing, said plug having a reduced upper portion extending upwardly into the interior of the gland, a packing ring extending about the upwardly projecting stem of the plug, and a screw cap engaging the gland for securing said packing ring in place.

2. A device of the character described comprising a body casting having alining ways therethrough and a central chamber communicating therewith and having a frusto-conical wall, a conical plug fitted to turn in said chamber and having a port adapted to register with said ways, upper and lower stems projecting from said plug, a packing ring surrounding the lower stem, a nut engaging with said body casting and with said packing ring, said casting being provided with an internal groove at its upper end having an external shoulder, said body casting also having screw threaded sockets opening out on its upper face, a gland placed upon said body casting and having a lateral flange provided with openings above said sockets and with a depending ring adapted to slidably enter said groove, set screws fitted through the openings in said flange and engaged with the threads in said sockets, a gasket of narrow width compared to said groove seated therein and adapted to be compressed by said gland, said gland extending inwardly above the plug chamber and having a depending central portion engaging the upper end of the plug, for holding the same tightly seated in the frusto-conical wall of the casting, said plug having a reduced upper portion extending snugly into the interior of said gland, a packing ring extending about the upper stem, and a nut engaging the gland for securing the upper packing ring in place.

FREDERICK C. HEYLMAN.